3,332,055
ADHESIVE COATING AND CALKING COMPOSITION

Paul M. Bogner, Whittier, Calif., assignor to K & W Products, Inc., Whittier, Calif., a corporation of Nevada
No Drawing. Filed Mar. 8, 1962, Ser. No. 178,267
9 Claims. (Cl. 339—278)

This invention relates to rubber-based adhesive coating, calking and sealing compositions having long-lasting tackiness and other important properties. Such substance may be particularly exemplified by improved gasket adhesive compositions which are characterized by continued tackiness and plasticity even after prolonged use and aging at high temperatures (i.e. up to about 200° C. or more). Such a composition may be used, for example, to attach the head gasket to an engine block; even a year or more later, the gasket can be easily lifted off the still-plastic adhesive layer of sealing composition because the layer has not become permanently solidified to the gasket (or to the engine block) in spite of many hours of high temperature, engine operation. In addition, the aged sealing composition can also be cleanly removed from the engine block, by use of a rubber solvent (such as naphtha or gasoline), if desired, in contrast to prior sealant compositions which after hardening or caking in place could only be difficultly removed by scraping or abrasive force.

Several outstanding characteristics of my improved composition are contributed by the intimate incorporation in a plastic vehicle (as hereafter defined) of finely divided, elementary (e.g. electrolytic) flaked copper which has been found to benefit the mixture in a number of ways. By the present invention a very small quantity—about 0.3% to about 1%, or no more than about 2%, by weight of the flaked copper—imparts a long lasting, shiny luster to the body of the coating composition. This feature is particularly useful for instance when spreading a thin layer of the substance over a surface having small cracks or pits which it is desired to fill; any crevice which has not accepted the plastic mixture then becomes visually evident by contrast with the adjoining shiny surface which retains such coating. Likewise, even a relatively thin edge of the sealing layer (i.e. above or beneath a mounted gasket) is clearly visible immediately after installation, upon even casual inspection, since it manifests a very pronounced sparkle and any discontinuity in the film becomes visually apparent. Even when the gasket is lifted off the body of the sealant film after continued high-temperature aging, the sparkle of the elementary copper may still be seen.

However, I have found also that such small quantities of flaked, powdered copper, uniformly dispersed through the composition seem to impart a heat transmitting quality to the mixture so that the whole acquires a cooling characteristic in contrast to the basic insulating property of the remainder of the composition in the absence of the copper. This is particularly desirable for some uses wherein the compositiion is used as a metal-to-metal seal. Such property is in marked contrast to somewhat analogous coating compositions, like paint, which may employ larger concentrations of flaked metallic powder, and in consequence there obtain a (desirable) insulating and heat resisting film, even without the initial insulating properties of a rubber component in the composition.

The higher concentration of metal used in these non-conducting ("metallic paint") films is such as to dispose the metal particles in continuous linear contact—even forming several juxtaposed layers; but in contrast, my much smaller copper concentration which might be supposed to result in the particles being more-or-less individually separated within the plastic matrix, yields a desirable heat-conducting or heat-dissipating composition useful both as a calking and coating.

Still another particular use of my composition is as a dressing for electrical connections or joints, applied to fill the small cracks and crevices inevitably arising between imperfectly registering conductor terminals. Such gaps otherwise may give rise to electric arcing and subsequent pitting and corrosion of the opposing metal surfaces. However, if the battery post of an automobile battery, for example, is first swabbed with my composition before attachment of the connecting cable, the latter will form a more satisfactory current-transmitting union or joint, and subsequent corrosion about the battery post is minimized or eliminated. For such application, it is believed that the primary beneficial result from my composition arises from its calking function, but since the improvement observed with the material compounded with copper powder is so much greater than the corresponding substance which lacks the copper, it is conceivable that even this small amount of dispersed copper acts as an electrical conductor. In addition, the adhesiveness of the composition is significant in such use, probably eliminating sparking across relatively small clearances, which the composition may surface-coat without necessarily filling.

In another application of the invention, it may be observed that a lighted cigarette placed on a sheet of paper coated or impregnated with the present composition will not ignite the paper since the heat is dissipated by the metallic copper and the cigarette is extinguished. Thus, to this extent, the composition may also be said to be fire resistant or fire retardant, and may be used to impart such qualities to otherwise inflammable or combustible sheet material, such as used in building and construction work (e.g. tarpaper, masking sheets, etc.) where an adhering quality is also desired. Such flexible webbing or sheet material which is impregnated or coated with my composition includes paper, woven or knit cloth, synthetic plastic such as cellulose acetate, polyethylene sheets, etc. A typical coating of about .001 to about .01 inch thickness is generally satisfactory to impart fire resistant or retardant properties to smooth surface material. For open-web fabric or discrete particles (e.g. sawdust, excelsior, shredded paper) larger quantities of my plastic composition (up to 10% or more) may be added as a combination impregnant and binder.

The adhesive characteristics of the composition also make it desirable as a surface coating of such sheet material which is employed to wrap articles for transport or storage. Alternately its nonsetting adhesiveness recommends such coated sheets as particularly applicable as masking material for employment preparatory to (spray) painting of selected exposed areas, or even for immersing such partially masked articles into treating solutions. For this last purpose, the masking sheet material when coated with my composition on both sides is also characterized by its inherent water imperviousness which is contributed by the body of the adhesive composition, in particular, by its elastomeric component.

Incorporation of the present small concentrations of finely divided metallic copper in calking compositions can be substituted (in whole or part) for such well known "cohesive contributing pigments" as zinc oxide, carbon black and Dixie clay, often taking the place of much greater concentrations of the latter. Generally, I prefer to employ (flaked) copper powder of about 250 mesh, or of which approximately 99% will pass through a 200 to 400 mesh screen. A suitable grade available from one commercial source contains approximately 99% of pigment which passes a 325 mesh screen and the balance passes through 200 mesh. In the flaking process the granules are surface coated with (no more than about 3%)

a suitable lubricant such as stearic acid which stabilizes their subsequent dispersion through the calking composition. Such coated, flaked pigment, derived from electrolytic copper is commercially available, although, not previously employed for the present purpose.

In preparing a pressure-sensitive adhesive such as the mentioned gasket sealing composition, I take any plastizable rubber (synthetic and/or natural) amounting to about 6% to about 18% of the weight of the final composition, and dissolve it in about 60% to about 80% of a rubber solvent. The latter for economic reasons is generally a comparatively low-boiling hydrocarbon mixture or narrow distillation cut, such as a petroleum fraction of the type known as Aliphatic Petroleum Naphthas, although halogenated or other miscible hydrocarbon derivatives or substituents are also applicable. I have found that a mixture of hexanes having a flash point below about 20° F. is very acceptable and is commercially available as an oil and fat extracting agent. (The same hydrocarbon "rubber solvents," as well as others, like ethylene chloride, carbon tetrachloride, etc. can later be used to remove the aged, more-or-less oxidized gasket sealant.)

Especially for use in the gasket sealing composition, I have found that an excellent rubber component is a styrene-butadiene copolymer, characterized by low water absorption properties. One such commercially available product, for example, has a bound styrene content of 2.5% to 24.5%; viscosity 30 to 38 ML-4 @ 212° F.; tensile strength 3100 p.s.i. minimum; elongation 550% minimum; modulus 900 to 1300 p.s.i.

I then add about 12% (based on weight of final composition) or on the order of about 6% to about 18% of a rubber-compatible resin. Such known resins blend with rubber and promote tack; numerous examples are cited for instance in United States Patent 2,410,053. For the present purpose, I have found esters based on hydrogenated rosin particularly effective, such as are commercially available for the lamination of metal foil, being characterized by resistance to oxidation and water insolubility. However, the present flaked copper, in addition to its other properties, appreciably prolongs the initial tackiness of the rest of the composition, perhaps by inhibiting further polymerization of the rubber component.

There may also be incorporated small quantities of plasticizers, anti-oxidants and viscosity depressants as commercially available for this purpose and required for a particular use. With the naphthenic rubber solvent, I prefer to use a petroleum-naphtha type plasticizer composed of predominantly non-aromatic, saturated constituents. A suitable commercial product of this type is characterized by API gravity 25.7; Sp. gr. 0.900 @ 60° F.; Flash point c.o.c. 405° F.; aniline point 213° F; S.S.U. viscosity 425 @ 100° F. and 53.8 @ 210° F.

The particular formula may be completed by about 0.2% to about 0.6% of an anti-oxidant such as a commercially available alkylated or styrenated phenol, as may be recommended to stabilize styrene-type polymers, and (from none) up to about 0.5% of a commercial viscosity depressant such as a sulfonated alkyl aryl hydrocarbon or analogous sulfonated petroleum derivative. For use as a gasket seal, the final composition has a viscosity typically of 1000 cp. or in the range of about 200 cp. to about 2000 cp.; being adapted to the nature of the gasket as well as the method of application used. Thus, it can be applied with a dauber, brush, or spatula to the engine block, and the gasket then almost immediately (or subsequently) compressed against it. A less viscous composition can even be sprayed on, while a very viscous composition (up to 3000 cp.) can still be applied with a putty knife or the like. For dip-coating sheet material, the viscosity may be as low as 50 cp.

The plastic vehicle or coating composition in which the flaked copper is incorporated may be the preceding, general purpose formula suitable for coating flexible sheet material and mounting metal or fabric gaskets, and can be tabulated:

Example 1

| | Percent by weight (about) |
|---|---|
| Rubber | 15 |
| Rubber solvent | 73.5 |
| Rubber-compatible resin | 9.5 |
| Plasticizer | 1.6 |
| Antioxidant | .4 |

With 1% flaked metallic copper, this composition makes a very satisfactory metal-to-metal seal for attaching a metal head gasket to an engine block.

For use with paper gaskets such as employed in automotive water-pumps, differential and transmission housings, etc., somewhat lower rubber and resin, and higher solvent content is appropriate, such as:

Example 2

| | Percent by weight (about) |
|---|---|
| Rubber | 10 |
| Rubber solvent | 80 |
| Rubber-compatible resin | 8 |
| Plasticizer | 1.5 |
| Antioxidant | .5 |

Alternately, a more viscous composition such as can be used to lay asphalt tile, composition panels, or other resinous flooring or surfacing units including laminated phenolics is as follows:

Example 3

| | Percent by weight (about) |
|---|---|
| Rubber | 18 |
| Rubber solvent | 60.0 |
| Rubber-compatible resin | 18 |
| Plasticizer | 3 |
| Antioxidant | 0.6 |
| Viscosity depressant | 0.5 |

Accordingly, an overall formula range is approximately

Example 4

| | Percent by weight (about) |
|---|---|
| Rubber | 6 to 18 |
| Rubber solvent | 60 to 80 |
| Rubber-compatible resin | 6 to 18 |
| Rubber antioxidant | .2 to .6 |
| Plasticizer | 1 to 3 |
| Viscosity depressant | .5 |

The flaked copper powder is then blended into the mixture as the final component, by mixing. If the composition has been stored for awhile, it may be desirable to stir it again before application.

Gaskets conventionally range in thickness from about .1 to .01 inch. The thickness of the sealant layer is of course immaterial as long as it covers the surface, since excess is squeezed out by the pressure of the gasket. When applied as a coating to sheet material such as paper or cellophane, the adhered film may be .01 to .001 inch. Coating both sides is of course readily effected by immersion; a single side can be sprayed, brushed or roller coated. The gasket sealant sufficiently dries (with say 50% solvent loss) in two minutes, so that a gasket can be quickly applied. Longer exposure (say ten minutes) results in less tack, but the film is still effective as adhesive sealant.

While the present invention has been here illustrated by examples of particular proportions and quantities presently preferred for specific uses, it will be apparent to a skilled chemist that a change of quantity of any one ingredient will require corersponding balancing adjustment of the other ingredients, and accordingly, such variations in the practice of the invention including substitution of functional equivalents are contemplated within the scope of the claims as hereafter defined.

I claim:

1. A plastic, gasket adhesive sealant composition of the character described, consisting essentially in intimate admixture of:

| | Percent by weight (about) |
|---|---|
| Rubber | 6 to 18 |
| Rubber solvent | 60 to 80 |
| Tack-promoting rubber-compatible resin | 6 to 18 | and a quantity of no less than about 0.3% and no greater than about 2% by weight of finely divided, flaked metallic copper adapted to promote continued tackiness of the composition upon aging and to disperse heat from a metal surface upon which a film of said composition may be applied with appreciable volatilization of said solvent.

2. A plastic, gasket adhesive sealant composition of the character described, consisting essentially in intimate admixture of:

| | Percent by weight (about) |
|---|---|
| Rubber | 15 |
| Mixed hexane having a flash point below 20° F. | 73.5 |
| Tack-promoting rubber-compatible resin | 9.5 |
| Plasticizer | 1.6 |
| Antioxidant | 0.4 | and about 1% of finely divided, flaked metallic copper adapted to promote continued tackiness of the composition upon aging and to disperse heat from a metal surface upon which a film of said composition may be applied with appreciable volatilization of said hexane.

3. A plastic, gasket adhesive sealant composition of the character described, consisting essentially in intimate admixture of:

| | Percent by weight (about) |
|---|---|
| Rubber | 10 |
| Rubber solvent | 80 |
| Tack-promoting rubber-compatible resin | 8 |
| Plasticizer | 1.5 |
| Antioxidant | .5 | and a quantity of no less than about 0.3% and no greater than about 2% by weight of finely divided flaked metallic copper adapted to promote continued tackiness of the composition upon aging and to disperse heat from a metal surface upon which a film of said composition may be applied with appreciable volatilization of said solvent.

4. A plastic, gasket adhesive sealant composition of the character described, consisting essentially in intimate admixture of:

| | Percent by weight (about) |
|---|---|
| Rubber | 18 |
| Rubber solvent | 60.0 |
| Tack-promoting rubber-compatible resin | 18 |
| Plasticizer | 3 |
| Antioxidant | 0.6 |
| Viscosity depressant | 0.5 | and a quantity of no less than about 0.3% and no greater than about 2% by weight of finely divided flaked metallic copper adapted to promote continued tackiness of the composition upon aging and to disperse heat from a metal surface upon which a film of said composition may be applied with appreciable volatilization of said solvent.

5. An electric current transmitting connection comprising a pair of metallic, terminal elements having respective contact faces tightly secured in mutual frictional engagement and having an adhesive calking seal disposed between said contacting surfaces so as to occupy any pits and crevices therebetween, whereby current transmission through said connection is improved and arcing and corrosion between the adjacent surfaces is minimized, said calking seal being formed by application of a surface coating of the composition of claim 1 to at least one of said contact faces prior to said frictional engagement.

6. The composition of the preceding claim 2 wherein said rubber consists essentially of styrene butadiene copolymer.

7. A flexible sheet of covering and wrapping material characterized by having at least one side covered by a nonhardening coating deposited essentially from the composition of the preceding claim 1 with volatilization of said rubber solvent.

8. A flexible sheet of covering and wrapping material characterized by having at least one side covered by a nonhardening coating deposited essentially from the composition of the preceding claim 3 with volatilization of said rubber solvent.

9. The composition of the preceding claim 6 wherein said tack-promoting rubber-compatible resin comprises esterified hydrogenated rosin.

References Cited

UNITED STATES PATENTS

| | | | |
|---|---|---|---|
| 2,357,851 | 9/1944 | Scheyer | 117—160 XR |
| 2,441,945 | 5/1948 | Frolich et al. | 117—160 XR |
| 2,506,728 | 5/1950 | McGrath | 260—762 |
| 2,577,281 | 12/1951 | Simon et al. | |
| 2,640,523 | 5/1953 | Palmer | 106—290 XR |
| 2,670,306 | 2/1954 | Folwell | 260—33.6 |
| 2,808,352 | 10/1957 | Coleman et al. | 117—160 XR |
| 2,951,247 | 8/1960 | Halpern et al. | 117—160 XR |
| 2,954,552 | 9/1960 | Halpern | 117—160 XR |
| 3,058,930 | 10/1962 | Samour | 260—33.6 |

MORRIS LIEBMAN, *Primary Examiner.*

D. W. ERICKSON, A. LIEBERMAN,
*Assistant Examiners.*